United States Patent [19]

Nakagawa et al.

[11] 4,205,910
[45] Jun. 3, 1980

[54] CONTROL DEVICE FOR A CAMERA SHUTTER

[75] Inventors: Tadashi Nakagawa; Ichiro Nemoto, both of Shikawatashi

[73] Assignee: Seiko Koki Kabushiki Kaisha, Japan

[21] Appl. No.: 946,053

[22] Filed: Sep. 26, 1978

[30] Foreign Application Priority Data

Sep. 27, 1977 [JP] Japan .................. 52-129797[U]

[51] Int. Cl.² ................. G03B 17/38; G03B 9/64; G03B 9/32
[52] U.S. Cl. .................. 354/267; 354/239; 354/242
[58] Field of Search ......... 354/266, 267, 226, 234–252

[56] References Cited

U.S. PATENT DOCUMENTS

| 3,825,940 | 7/1974 | Hayami | 354/241 |
| 3,893,143 | 7/1975 | Taguchi et al. | 354/239 X |

FOREIGN PATENT DOCUMENTS 207550  4/1957  Australia ................. 354/242

Primary Examiner—Donald A. Griffin
Attorney, Agent, or Firm—Robert E. Burns; Emmanuel J. Lobato; Bruce L. Adams

[57] ABSTRACT

A control device for the shutter of a camera comprises an opening member for opening a shutter aperture to initiate taking of an exposure, a closing member for closing the aperture to complete the exposure, and opening and closing pawls for respectively retaining the opening and closing members at their charged position. A control member actuated during the shutter release motion releases the engagement of the opening pawl from the opening member, and a governor is provided for delaying the operation of the control member. An interlock lever is actuated by the opening member to release the engagement of the closing pawl from the closing member, and an exposure time setting cam is provided for adjustably setting the motion of the governor so as to shift the interlock lever between its working position and rest position. The interlock lever is positioned at its rest position when the exposure time setting cam is set to its high speed adjusting position so that the control member successively releases the opening pawl and the closing pawl while the interlock lever is positioned at its working position when the exposure time setting cam is set to its middle speed adjusting position so that the motion of the control member is delayed by the governor after the opening member is released from the opening pawl by the control member before the opening member actuates the interlock lever to release the closing member.

1 Claim, 6 Drawing Figures

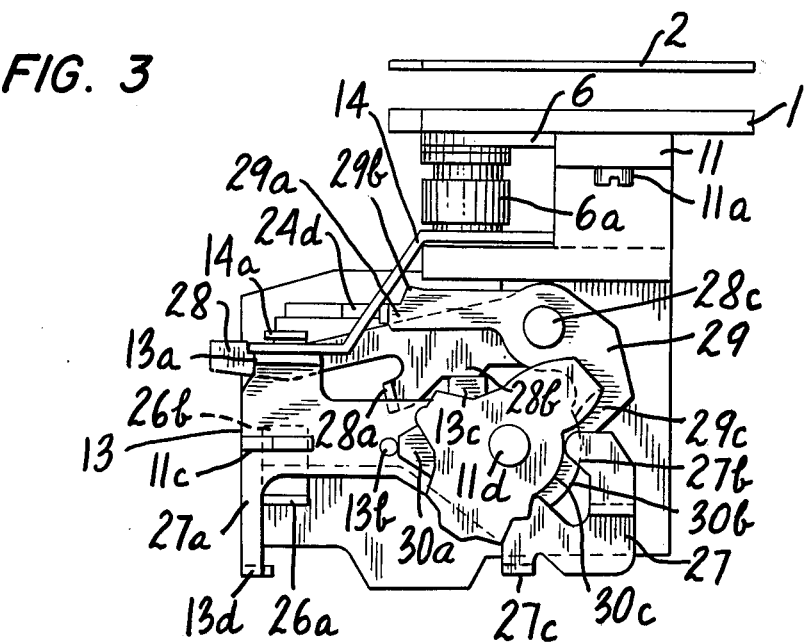
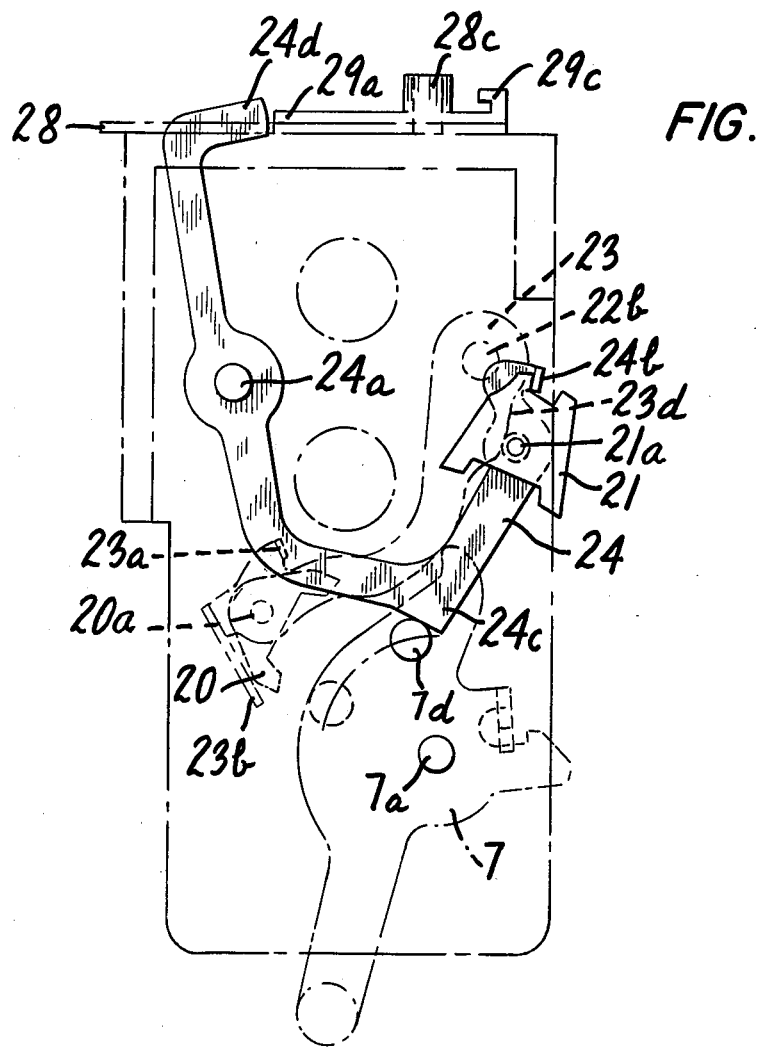

CONTROL DEVICE FOR A CAMERA SHUTTER

BACKGROUND OF THE INVENTION

This invention relates to a control device for the shutter of a camera.

Various methods have been introduced for delaying shutter aperture closing timing by means of mechanical devices to thereby control the exposure time.

In the most commonly used method, a control member released during the shutter releasing operation successively releases an opening member and a closing member under the control of a mechanical delaying device. In this conventional method, although the shortest exposure time under the high speed setting and the relatively long exposure time under the low speed setting are accurately controlled, the control of the middle range of exposure times is unstable due to the scatter of the setting position of the mechanical delaying device. This is because under the high speed setting, the mechanical delaying device is at its rest position and the exposure time is controlled stably depending only on the speed of the control member whereas under the low speed setting, the error of the exposure time due to the scatter of the setting position of the mechanical delaying device is negligibly small relative to the exposure time; however, under the middle speed setting, the error of the exposure time due to the scatter of the setting position of the mechanical delaying device counts for much because the middle speed is controlled by the engagement of the mechanical delaying device for only a short period of time.

Disclosed in pending Application Ser. No. 787,204 now U.S. Pat. No. 4,134,659 issued Jan. 16, 1979, is an exposure time control device comprising a control system wherein the opening member releases the closing member during its opening motion in addition to the control system including a mechanical delaying device and being arranged so that the components are used selectively; however, the range of the exposure time controllable by controlling the timing of the release of the closing member by the opening member became limited as a consequence of the reduction of the stroke of the opening member due to the reduction of dimensions of shutters. Particularly, in controlling short exposure time, unstable motion of the opening member resulted in inaccurate exposure.

SUMMARY OF THE INVENTION

Accordingly, an object of this invention is to provide a reliable control device for the shutter of a camera which accurately controls the exposure time and which operates stably through the high speed, middle speed and low speed setting ranges. In the high speed setting including the minimum exposure time, the control member released during the shutter release operation actuates the opening pawl to release the opening member, then actuates the closing pawl to release the closing member to perform an exposure. In the middle speed setting, the opening member actuates the closing member while the control member is delayed by the delaying device, such as a governor, after it actuated the opening member and in the low speed setting, the control member first releases the opening member, then releases the closing member after a delayed period of time controlled by the delaying device.

BRIEF DESCRIPTION OF THE DRAWINGS

FIG. 3 is an upper side view of the shutter of FIGS. 1 and 2 in a state with the exposure period being set to the shortest period;

and FIGS. 4, 5 and 6 are fragmentary views showing respective parts of the shutter corresponding to the charged state of FIG. 2.

DETAILED DESCRIPTION OF PREFERRED EMBODIMENT

Figure 1:
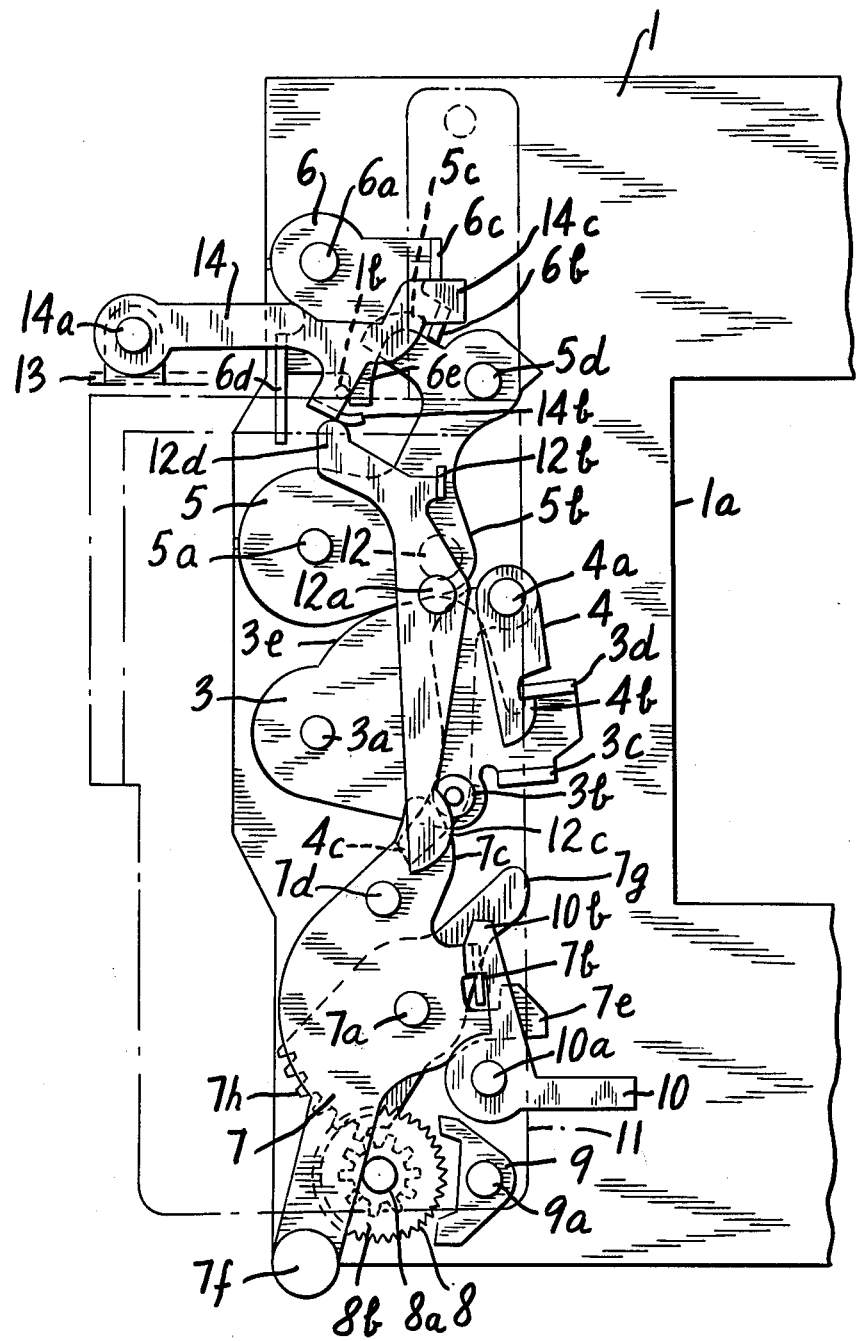
FIG. 1 is a plan view of part of a camera shutter in the charged state of the shutter.

Referring to FIG. 1, a shutter base plate 1 is formed with a shutter opening 1a for effecting an exposure and is covered with opening blade means (not shown). Also, closing blade means (not shown) is accommodated in an upper edge portion of the opening 1a for completing the exposure. Each of the blade means is supported such that it can operate within a plane parallel to a plate member 2 of the same shape as the shutter base plate 1 and extending parallel thereto. The opening and closing blade means are of a type well known in the art and therefore need not be further described.

An opening member 3 is pivoted on a shaft 3a to the base plate 1, and it is biased for clockwise rotation by a spring (not shown). The opening member 3 is provided on its right side portion, as viewed in FIG. 1, with a two-stage protuberance 3b for charging, upwardly projecting bent portions 3c and 3d, a cam portion 3e formed on the upper outer periphery, and a lower protuberance (not shown) operably coupled to the opening blade means. The bent portion 3d releasably engages with a hook 4b of an opening pawl 4.

The opening pawl 4 is mounted on a shaft 4a on the base plate 1 and is rotatably supported with counterclockwise bias torque provided by a spring (not shown). Further, the opening pawl 4 is integral with a downwardly extending arm 4c.

A closing member 5 is rotatably mounted on a shaft 5a on the base plate 1 and is biased for clockwise rotation by a spring (not shown). The closing member 5 is provided on its right side portion with an upper protuberance 5b for charging, a hook 5c and a lower protuberance 5d operably coupled to the closing blade means, with the hook 5c in engagement with a bent portion 6b of a closing pawl 6.

The closing pawl 6 is mounted by a shaft 6a on the base plate 1 and is rotatably supported with counterclockwise torque provided by a spring (not shown). It is provided with two, upwardly projecting bent portions 6c and 6d and a convex portion 6e engaging a projection 1b projecting from the base plate 1.

An operating member 7 is pivoted by a shaft 7a to the base plate 1 and is biased for counterclockwise rotation by a spring (not shown). The operating member 7 is provided with an upwardly projecting engagement bent portion 7b, a cam portion 7c engaging with the two-stage protuberance 3b of the opening member 3, a hook 7e engaging with the bent portion 3c of the opening member 3, a protuberance 7f for charging engaging with a winding member of the camera, and a protuberance 7g and gear portion 7h formed under and integral with it.

The gear portion 7h is in mesh with a small gear 8b of a zigzag wheel 8, which is pivoted by a shaft 8a to the base plate 1, and the rotation of which is controlled by an anchor 9 similarly pivoted to the base plate 1. The anchor 9 is pivoted by a shaft 9a to the base plate 1.

A release lever 10 is pivoted by a shaft 10a to the base plate 1, and it is biased for counterclockwise rotation by a spring (not shown). It is provided at its tip with a hook 10b in engagement with the bent portion 7b of the operating member 7.

A control base plate 11 composed of synthetic resin or the like is provided such as to cover the aforementioned individual members as indicated by the broken line and is mounted on the base plate 1 by means of a screw 11a in a well-known manner. The control base plate 11 is formed with an escapement portion, which is penetrated by the shafts 3a, 5a, 7a and 10a and also by the two-stage protuberance 3b and pin 7d, and is also formed with an upper channel-shaped protuberance 11b.

An interlock lever 12 is pivoted by a shaft 12a to the back side of the control base plate 11, and has a bent portion 12b acted upon by a spring (not shown) for clockwise rotation. It is also provided with a cam arm 12c projecting into the operating region of the two-stage protuberance 3b of the opening member 3 and also with an operating protuberance 12d formed at the other end.

An adjustment lever 13 is slidably supported on the channel-shaped protuberance 11b of the control base plate 11 for movement in the transverse directions in a plane normal to the base plate 1 and the lever 13 is biased in the rightward direction by a spring (not shown).

A fulcrum lever 14 is pivoted by a shaft 14a to the adjustment lever 13 and is provided with a bent portion 14b engaging with the operating protuberance 12b of the interlock lever 12 and an arm 14c engaging with the bent portion 6c of the closing pawl 6.

Figure 2:
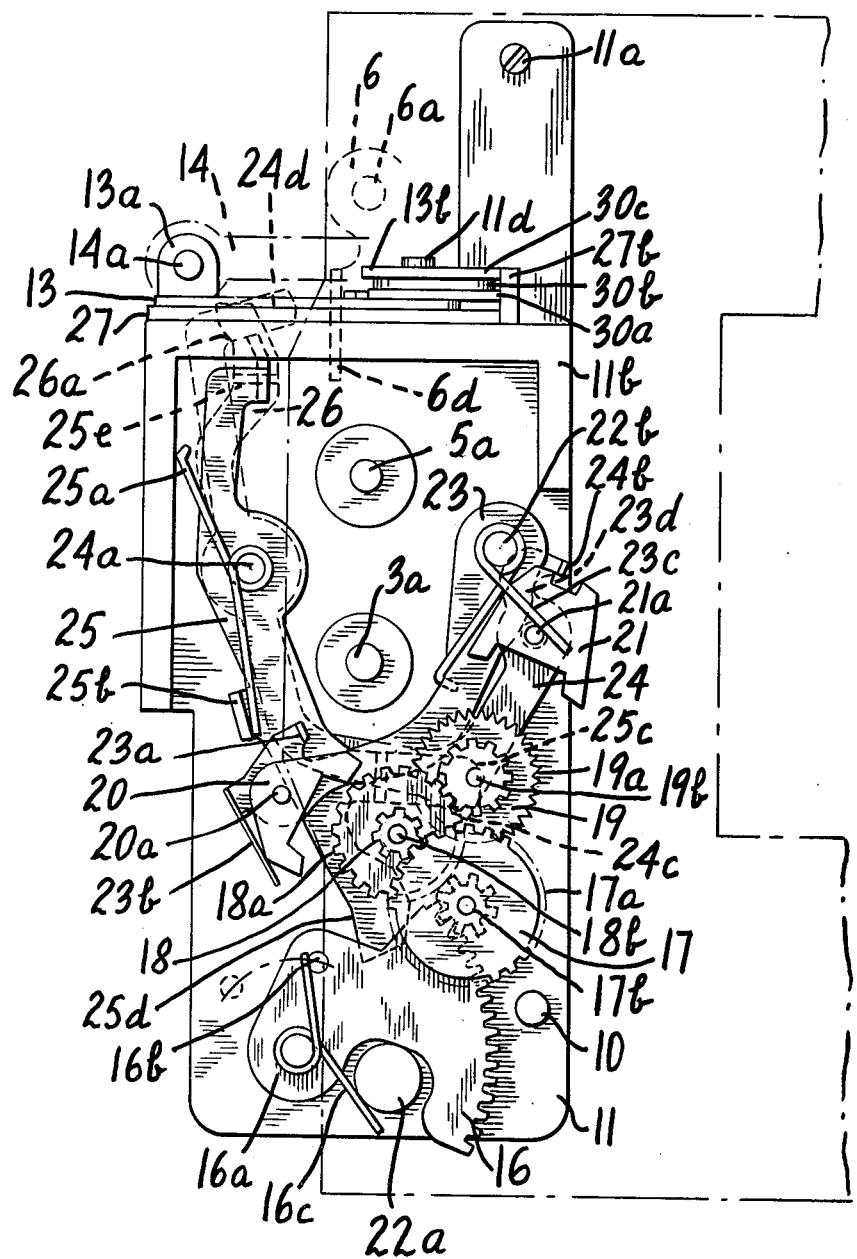
FIG. 2 is a plan view of the control section of the shutter of FIG. 1 and in the charged state.
Figure 5:
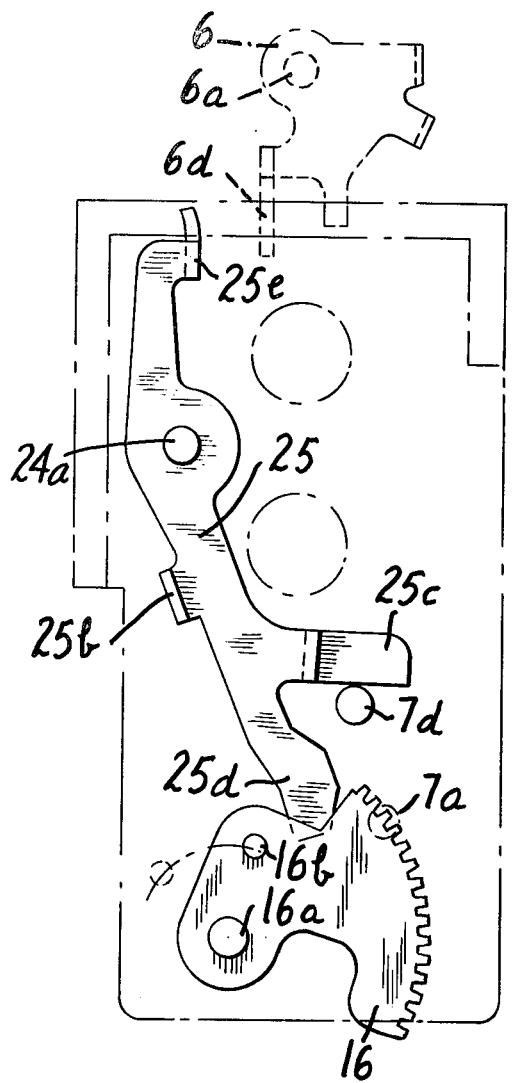

FIG. 2 shows a control mechanism arranged on top of the parts shown in the charged state in FIG. 1, and FIG. 2 likewise shows the parts in the charged state.

A delaying means in the form of a governor for controlling the exposure period comprises a gear train including a sector-shaped first wheel 16, a small gear 17 in mesh therewith, a gear 17a integral with the small gear 17, a small gear 18 in mesh with the gear 17a, a gear 18a integral with the small gear 18, a small gear 19 in mesh with the gear 18a, a zigzag gear 19a integral with the small gear 19, a first anchor 20 in mesh with the gear 18a and a second anchor 21 in mesh with the zigzag gear 19a, and the individual gears are rotatably supported between two plates (not shown) supported by pillars 22a and 22b.

The first wheel 16 is supported by a shaft 16a and has a vertically projecting pin 16b, and it is urged by a clockwise rotation spring 16c to be in forced contact with the pillar 22a. The gears 17, 18 and 19 are supported by respective shafts 17b, 18b and 19b.

The first anchor 20 is rotatably mounted by a shaft 20a on an anchor lift lever 23, which is rotatably supported by the pillar 22b, and its operating region is restricted by bent portions 23a and 23b of the anchor lift lever 23.

The second anchor 21 is rotatably supported by a shaft 21a on a switching member 24.

The switching member 24 is rotatably supported by a shaft 24a on the control base plate 1 and is provided with a bent portion 24b for restricting the operating region of the second anchor, an urging portion 24a engaging with the pin 7d of the operating member 7 (see FIG. 4) and an engagement arm 24d. The shaft 21a is acted upon a spring 23c acting between it and the anchor lift lever 23 so that the anchor 21 is forced to urge the switching member 24 in the direction for meshing with the zigzag gear 19.

The shaft 21a has its lower stem portion in engagement with a cam portion 23d of the anchor lift lever 23, and the cam portion 23d is formed such that with the pin 7a in the shutter charge portion, the first and second anchors 20 and 21 are held raised by the switching member 24 in their respective inoperative positions out of mesh with the associated gear 18a and zigzag gear 19a; but with movement of the pin 7a caused in an interlocked relation to the operation of the shutter, the first anchor 20 is displaced to an operative position meshing with the gear 18a and then the second anchor 21 is displaced to an inoperative position meshing with the zigzag gear 19a.

A control lever 25 is fitted on a shaft 24a and is biased for clockwise rotation by spring 25a acting upon its bent portion 25b. It is provided with a bent portion 25c engaging with the pin 7d of the operating member 7, an operating arm 25d engaging with a downwardly extending portion of the pin 16b extending from the first gear 16 and also engaging with a lower bent portion 25e engaging with the bent portion 6d of the closing pawl 6.

Figure 6:
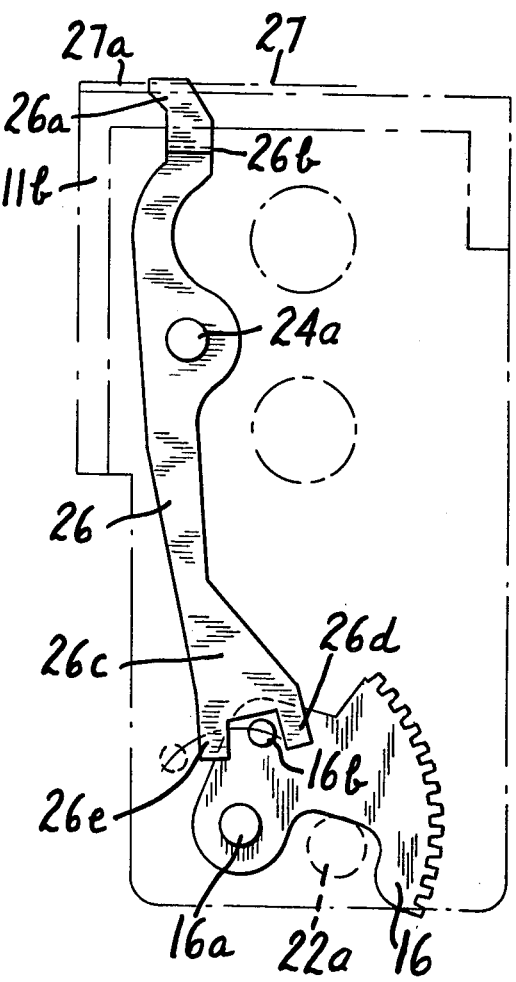

An operating lever 26 is fitted on a further upper portion of the shaft 24a and through the operating ever is shown only by a broken line in FIG. 2, its detailed form is shown in FIG. 6. The operating lever 26 has an operating arm 26a having a bent portion 26b formed in part of the operating arm 26a, and another arm 26c whose tip is bifurcated into protuberances 26d and 26e engaging the upper protuberance of the pin 16b of the first gear 16.

On top of the channel-shaped protuberance of the control base plate 1 are supported individual parts interlocked to a switching dial of the camera for switching the exposure period, and they will not be described with reference to FIGS. 2 and 3.

A converting lever 27 engaging with the operating arm 26a of the operating lever 26 is supported by the protuberance 11c of the control base plate 11 and shaft 11d thereof, and the lever 27 is movable in the transverse directions in the figure. On the lever 27 is provided a protuberance 27a engaging with the operating arm 26a, a two-stage bent portion 27b and a bent portion 27c serving as spring hook.

The adjustment lever 13 is supported by the protuberance 11c and shaft 11d in an overlapping relation with respect to the converting lever 27 and is movable in the transverse directions in the figure and is provided with a bent portion 13a supporting the fulcrum lever 14, an upward protuberance 13a, a downward bent portion 13 and a bent portion 13d serving as spring hook.

A spring (not shown) is provided between the aforementioned spring hook bent portions 27e and 13b and biases the converting lever 27 in the lefthand direction and the adjustment lever 13 in the righthand direction.

A bulb lever 28 projects into the operating region of a release button (not shown) of the camera and is provided with a lower bent portion 28a engaging with the bent portion 26b of the operating lever 26 and a stepped portion 28b engaging with the lower portion of the adjustment lever 13. It is rotatably supported on a shaft 28c and is biased in the counterclockwise direction by a spring (not shown). In the illustrated state, the stepped portion 28b is restrained by the bent portion 13c so that the lower bent portion 28a is out of engagement with the bent portion 26b of the operating lever 26.

A restraining lever 29 is fitted on a shaft 28c and is provided with two stepped portions 29a and 29b engaging with the engagement arm 24d of the switching member 24 and an operating arm 29c, and it is biased for clockwise rotation by a spring (not shown).

Three cam plates 30a, 30b and 30c are rotatably supported in a mutually integrated state on the shaft 11d. The cam plate 30a engages the upper protuberance 13b of the adjustment lever 13, the second cam plate 30b engages the operating arm 29c of the restraining lever 29, and the third cam plate 30c engages the convex portion provided in the two-stage bent portion 27b of the converting lever 27.

In the illustrated state, the upper protuberance 13b is urged in the leftward direction by the cam plate 30a, with the adjustment lever 13 supporting the fulcrum lever 14 in the most leftward position so that the bent portion 14b is held at a position closest to the operating protuberance 12d of the interlock lever 12. Also, with the action of a clockwise rotation spring (not shown) the operating arm 29c causes the stepped portion 29a to be displaced to the operating region of the engagement arm 24d of the switching member 24. Further, by the third cam plate 30c, the convex portion provided on the two-stage bent portion 27b of the converting lever 27 is urged in the rightward direction to cause extension of the spring stretched between the spring hook bent portions 13d and 27c and also to cause the protuberance 27a to displace the operating arm 26a of the operating lever 26 in the rightward direction in FIG. 3, thus holding the operating lever 26 in the state of FIG. 6, while at the same time the pin 16b of the first gear 16 is held in engagement with the operating arm 25d of the control lever 25.

Now, the manner of operation in the case when the shutter is released from the above charged state will be described.

When the camera release button (not shown) is depressed, the release lever 10 is rotated counterclockwise about the shaft 10a against the force of a spring (not shown) to release the engagement bent portion 7b having previously been in engagement with the hook 10b.

When the engagement of the engagement bent portion 7b is released, the operating member 7 is rotated by a counterclockwise rotation spring (not shown) to cause the integral gear portion 7h to rotate the small gear 8b in unison with the gear 8, causing oscillation of the anchor 9 in mesh therewith, whereby counterclockwise rotation of the gear portion 7h and operating member 7 integral therewith are braked.

With the counterclockwise rotation of the operating member 7, the urging portion 24c of the switching member 24 is released by the upwardly projecting pin 7d, whereupon the switching member 24 is rotated about the shaft 24 in the clockwise direction by the spring 23c. However, since the engagement arm 24d is engaged by the stepped portion 29a of the restraining lever 29, the first and second anchors 20 and 21 are held in their respective states out of engagement with the associated gear 18 and zigzag gear 19a. At the same time, the bent arm 25c of the control lever 25, following the pin 7d, is rotated in the clockwise direction about the shaft 24a by the spring 25a, so that the operating arm 25d is delayed by engagement with the downward protuberance of the pin 16 of the first gear 16.

In the course of operation of the operating member 7, the protuberance 7g thereof pushes the arm 4c of the opening pawl 4 to cause clockwise rotation thereof about the shaft 4a until the engagement of the bent portion 3d of the opening member 3 with the hook 4b is released. The operating member 7 has its charge protuberance 7f brought into engagement with and stopped by the stem of the shaft 10a with the opening pawl 4 in the position after counterclockwise rotation.

Meanwhile, when the engagement of the bent portion 3d is released, clockwise rotation of the opening member 3 about the shaft 3a is caused by a spring (not shown) to operate the shutter blade means (not shown), thus opening the shutter opening 1a to start an exposure. With the clockwise rotation of the opening member 3, the two-stage protuberance 3b is rotated about the shaft 3a to push the cam arm 12c of the interlock lever 12, causing clockwise rotation of the interlock lever 12 about the shaft 12a, whereby the operating protuberance 12d is brought into engagement with the bent portion 14b of the fulcrum lever 14 and causes the fulcrum lever 14 to rotate about the shaft 14a in the counterclockwise direction. With the operation of the fulcrum lever 14, the arm 14c thereof pushes the bent portion 6c of the closing pawl 6 to cause counterclockwise rotation thereof about the shaft 6a, thus releasing engagement between the lower bent portion 6b and hook 5c of the closing member 5.

When the engagement of the hook 5c is released, the closing member 5 is rotated by a spring (not shown) about the shaft 5a in the clockwise direction to operate the shutter blade means (not shown), thus closing the shutter opening 1a to bring an end to the exposure.

After the operating arm 25d is delayed by engagement with pin 16b of the first gear 16, the lower bent portion 25e of the control lever 25 engages with the bent portion 6d of the closing pawl 6. However, since the closing pawl 6 has already been operated by the interlock lever 12, the closing pawl 6 is pushed after the operation of the closing member 5. Thereafter, the bent portion 25b is brought into engagement with one side of the channel-shaped protuberance of the control base plate 11, whereupon the control lever 25 is stopped. The opening member 3 is prevented from rebounding away from its rest position by engagement of the bent portion 3c with the hook 7e of the operating member 7.

To charge the shutter again, the charge protuberance 7f of the operating member 7 is rotated in the clockwise direction about the shaft 7a, and while oscillating the zigzag wheel 8 and anchor 9 with the gear portion 7h, the two-stage protuberance 3b of the opening member 3 is pushed with the cam portion 7c, causing counterclockwise rotation of the opening member 3 about the shaft 3a to bring the shutter blade means (not shown) to the charged position while also charging a spring (not shown).

Simultaneously with the counterclockwise rotation of the opening member 3, the cam portion 3e pushes the upper protuberance 5b of the closing member 5 to cause counterclockwise rotation thereof about the shaft 5a, thus bringing the shutter blade means (not shown) to the charged position while also charging a spring (not shown).

With the clockwise rotation of the operating member 7, a spring (not shown) for the operating member is charged, while at the same time, the bent portion 25c of the control lever 25 is pushed by the upwardly projecting pin 7d, whereby the control lever 25 charges the spring 25a and is rotated in the counterclockwise direction to the charged position of the operating member 7.

At the same time, the urging portion 24c of the switching member 24 is pushed by the pin 7d, causing counterclockwise rotation of the member 24 to separate the engagement arm 24d from the stepped portion 29a of the restraining lever 29.

When the charged position is reached by the operating member 7, the engagement bent portion 7b is engaged by the hook 10b of the release lever 10, the bent portion 3d of the opening member 3 is engaged by the hook 4b of the opening pawl 4, and further the hook 5c of the closing member 5 is engaged by the bent portion 6b of the closing pawl 6, so that the charged state of FIGS. 1 and 2 is obtained.

In the above operation, the fulcrum lever 14 is supported at its most leftward position so that the exposure period is controlled to the middle period (for instance 1/500 second). By subsequently operating the exposure period select dial (not shown) of the camera to cause counterclockwise rotation of the cam plates 30a, 30b and 30c about the shaft 11d, the upper protuberance 13b of the adjustment lever 13 is caused by the cam plate 30a to be displaced in the rightward direction by the spring stretched by the spring hook bent portion 3d, thus pushing the fulcrum lever 14 in the rightward direction from the state of FIG. 1.

As the fulcrum lever 14 is pushed in the rightward direction, the bent portion 14b and arm 14c of the lever 14 act to change the relative operative phases of the operating protuberance 12d of the interlock lever 12 and bent portion 6c of the closing pawl 6, whereby the two-state protuberance 3b of the opening member 3 operates, in a further rotated position, the closing pawl 6 via the interlock lever 12 and fulcrum lever 14, that is, the exposure period is controlled to progressively longer periods (for instance, 1/250 sec., 1/125 sec., etc.). At this time, the cam plates 30b and 30c hold the restraining lever 29 and converting lever 27 in the respective positions with respect to the respective switching member 24 and operating lever 26 in the manner as described above.

With further counterclockwise rotation of the cam plates 30a, 30b and 30c, the fulcrum lever 14 reaches a position at which the closing pawl 6 is not operated despite the rotation of the interlock lever 12.

At this time, the cam plate 30b comes to hold the stepped portion 29a of the restraining lever 29 at a position out of mesh with the first and second anchors 20 and 21, and the cam plate 30c causes the converting lever 27 to be moved in the clockwise direction by the spring biasing the spring hook bent portion 27c as it is followed by the convex portion of the two-stage bent portion 27b, thus releasing the restrainment of the operating arm 26a by the protuberance 27a, whereby the operating lever 26 is rotated about the shaft 24a in the counterclockwise direction as it is urged by the pin 16b biased by the spring 16c of the first gear 16.

The position of the first gear pin 16b is also regulated in correspondence with the angular movement of the cam plate 30c and, upon shutter release, the rotation of the operating arm 25d of the control lever 25 is controlled to control the exposure period, for instance, to 1/60 second.

By counterclockwise rotation of the operating member 7, the opening member 3 is operated and during this movement, the control lever 25 is delayed, the operating arm 25d and the bent portion 25e push the bent portion 6d of the closing pawl 6 rightward, and the closing member 5 is released to terminate the exposure.

When the cam plates 30a, 30b and 30c are further rotated in the counterclockwise direction, the cam 30b causes counterclockwise rotation of the stepped portion 29b of the restraining lever 29 to a position corresponding to the engagement arm 24d of the switching member 24 without movement of the adjustment lever 13 and fulcrum lever 14. If the shutter is released in this state, clockwise rotation of the opening member 3 is caused to start an exposure and the operating arm 25d comes to engage the pin 16b of the first gear 16 and thereby control its rotation. However, since the switching member 24 follows the pin 7d of the operating member 7 and executes clockwise rotation up to a position at which the engagement arm 24d is engaged by the stepped portion 29b of the restraining lever 29, the cam portion 23d is released from the shaft 21a, whereby the anchor lift lever 23 is rotated by the spring 23c about the pillar 22b in the counterclockwise direction, with the first anchor 20 in mesh with the gear 18a. The exposure period at this time corresponds to a period in which the position of the pin 16b of the first gear 16 is regulated in correspondence to the cam plate 30c; for instance, the control lever 25 is controlled for controlling the exposure period to 1/30 sec., 1/15 sec., ⅛ sec., etc., and with operation of the closing pawl 6 caused by the bent portion 25e, an end is brought to the exposure.

With still further counterclockwise rotation of the cam plates 30a, 30b and 30c, the cam plate 30b causes counterclockwise rotation of the restraining lever 29 about the shaft 28c to a position at which its stepped portions 29a and 29b are out of engagement with the engagement arm 24d without movement of the adjustment lever 13 and fulcrum lever 14.

When the shutter is released in this state, counterclockwise rotation of the operating member 7 is caused and followed by the pin 7d, causing rotation of the urging portion 24d of the switching member 24 to cause rotation of the first and second anchors 20 and 21 to respective positions in mesh with the respectively associated gear 18 and zigzag gear 19a and also rotation of the anchor lift lever 23 and switching member 24 by the spring 23c. With further rotation of the operating member 7 to release the opening member 5, the operating arm 25d is brought into engagement with the pin 16b causing rotation of the gear train and oscillation of the first and second anchors, whereby the position of the pin 16b is regulated by the converting lever 27 corresponding to the cam plate 30c and the operating lever 26. Thus, the control lever 25 is controlled to control the exposure period to, for instance ¼ sec., ½ sec., 1 sec., etc., and with operation of the closing pawl 6 caused by the bent portion 25e, the closing member 5 is released to bring an end to the exposure.

In order for the exposure to be effected during the depressed state of the camera release button and in order for a flash bulb operation to be effected by releasing the button, the cam plates 30a, 30b and 30c are further rotated in the counterclockwise direction so that the cam plate 30a permits movement of the upper protuberance 13b, causing further rightward movement of the fulcrum lever 14. Thus, since the operating protuberance 12d and bent portion 6c are held independently of each other and since the lower bent portion 13c of the adjustment lever 13 escapes from the stepped portion 28b of the bulb lever 28 and is moved in the rightward direction, the bulb lever 28 is rotated in the counterclockwise direction about the shaft 28c by a spring (not shown) to follow and be brought into contact with the release button of the camera (not shown). Also, the cam plates 30b and 30c respectively hold the restraining lever 29 and converting lever 27 in the respective states of not engaging the engagement arm 24d and not operating the operating arm 26a.

When the camera release button is depressed in this state, the bulb lever 28, following this, is rotated in the counterclockwise direction, whereby the lower bent portion 28a is introduced into the operative region of the bent portion 26b of the operating lever 26. When the release button is further lowered to cause clockwise rotation of the release lever 10, counterclockwise rotation of the operating member 7 is caused and followed by the switching member 24, causing the displacement of the first and second anchors 20 and 21 to their respective operative positions and release of the opening member 3 to start an exposure. The operating arm 25d is delayed by the pin 16b and the control lever 25 is rotated in the clockwise direction. When the pin 16b engages the protuberance 26e of the operating lever 26, it locks the control lever 25 in that position since the bent portion 26b is engaged by the bent portion 28a of the bulb lever 28. By releasing the release button, the bulb lever 28 is rotated in the clockwise direction against a spring (not shown) to release the engagement between the lower bent portion 28a and bent portion 26b, whereby clockwise rotation of the operating lever 26 is caused by the operating arm 25d of the control lever 25 as the urging protuberance 26e is urged by the spring 25a via the pin 16b. At this time, the bent portion 6d of the closing pawl 6 is pushed by the bent portion 25e of the control lever 25, whereby the engagement of the closing member 5 is released by the bent portion 6b to bring an end to the exposure.

It is possible to make an arrangement such that during the operation of the bulb lever, the cam plate 30b causes the restraining lever 29 to bring the stepped portion 29b and engagement arm 24d into engagement with each other so that only the first anchor is oscillated.

Also, while in the above embodiment the first anchor 20 and second anchor 21 are adapted to be engaged and disengaged, it is also possible to arrange the parts such that part of the gear train is separated for engagement or disengagement or such that part of the gear train is switched to change the rotation ratio for engagement and disengagement of some gears, and no limitation is imposed upon the member which is engaged and disengaged.

As the cam plates 30a, 30b and 30c are rotated further counterclockwise, the cam plate 30b rotates the restraining lever 29 clockwise about the pin 28c so that the engagement arm 24d is engaged again with the stepped portion 29a while the adjustment lever 13 and the fulcrum lever 14 remain as they are. The cam plate 30c pushes the converting lever 27 rightward so that the projection 27a rotates the operating lever 26 clockwise about the pin 24a, consequently, the pin 16b of the first wheel 16 is withdrawn from the course of movement of the arm 25d of the control lever 25.

When the shutter is released under this condition, the control lever 25 rotates clockwise about the pin 24a following the pin 7d according to counterclockwise rotation of the operating member 7. During the continuous rotation of the operating lever 7, the operating lever 7 first rotates the opening pawl 4 about the pin 4a to release the opening member 3, then the control lever 25 continues clockwise rotation following the further rotation of the operating member 7 and pushes the bent portion 6d of the closing pawl 6 with the lower bent portion 25e to release the closing member 5 so that the exposure is accomplished. In this operation, the control lever 25 is not delayed at all so that a short exposure time, for instance 1/1000 second, is controlled.

In the embodiment described above, the device is constructed so that the operating member 7 and the control lever 25 actuate the opening pawl 4 and the closing pawl 6, respectively; however, in most cases the control lever 25 is adapted to be retained by the release lever 10, released to actuate the opening pawl 4 and delayed before actuating the closing pawl by the governor.

As described above, in the adjustment of the high speed, a member released during the shutter releasing operation releases the closing member, without being delayed, after releasing the opening member; in the adjustment of the middle speed, the opening member, which has been previously released, releases the closing member through the engagement lever while a member released during the course of the shutter releasing operation is delayed by the delaying device after it has released the opening member; and in the adjustment of the low speed, a member released during the shutter releasing operation releases the opening member, which is delayed by the delaying device, and releases then the closing member to accomplish the exposure.

What we claim is:

1. In a camera having a shutter aperture; an opening member for effecting opening of the shutter aperture to initiate an exposure; a closing member to effect closing of the shutter aperture to complete the exposure; an opening pawl engageable with said opening member and a closing pawl engageable with said closing member for respectively retaining said opening and closing members in their charged position; a control member actuated during the shutter release motion to release said opening pawl from engagement with said opening member; a governor for delaying the operation of said control member; an interlock lever actuated by said opening member to release said closing pawl from engagement with said closing member; and means including exposure time setting cam means settable to a plurality of speed adjusting positions for adjustably setting the motion of said governor so as to shift said interlock lever between a working position and a rest position so that said interlock lever is positioned at its rest position when said exposure time setting cam means is set to its high speed adjusting position whereby said control member releases said opening pawl and said closing pawl successively, and so that said interlock lever is positioned at its working position when said exposure time setting cam means is set to its middle speed adjusting position whereby the motion of said control member is delayed by said governor after the opening member is released from said opening pawl by said control member before said opening member actuates said interlock lever to release said closing member.

* * * * *